Patented May 3, 1938

2,116,377

UNITED STATES PATENT OFFICE 2,116,377

PROTEIN, PROTEIN COMPOUND, AND METHOD OF PREPARATION

Carmelo Baldini, Bronx, N. Y.

No Drawing. Application November 19, 1936, Serial No. 111,739

2 Claims. (Cl. 167—74)

This invention relates to a protein composition and method of manufacturing it, and has for its object to provide, in a manner as hereinafter set forth, a composition of the class described.

The protein forming the basis of this invention is a lymphatic substance in the form of a treated dried extract from the lymphatic glands of an ox, sheep or the calf of a cow. The lymphatic substance may be combined particularly with and is especially useful in a composition for improving the blood, embodying for example:—Sodium iodide, sodium methylarsenate, an aqueous solution of *Secale cornutum* (ergot), carbolic acid and distilled water.

The preferred proportions of the constituents of the composition are to wit:

|  | Grams |
|---|---|
| Lymphatic substance | 0.15 |
| Sodium iodide | 0.20 |
| Sodium methylarsenate | 0.15 |
| Aqueous solution of *Secale cornutum* | 0.05 |
| Carbolic acid | 0.03 |
| Distilled water (or 1 c. c.) | 1.00 |

The composition is a liquid.

The lymphatic substance is treated as follows for production of the protein product: 15.00 grams of the substance is diluted in 100.00 grams of distilled water and exposed for five hours to the action of 0.50 gm. of amylopsin, 1.00 gm. of pepsin and twenty-five drops of hydrochloric acid. This composition or mixture is then exposed for five more hours to the action of pancreatin, after which for ten hours it is dialized. After the dialization the compound is filtered and the filtrate is dried. The filtrate may then be combined with a mixture of the other constituents of the blood improver composition.

The proportion of the lymphatic substance may vary from 0.15 to 0.30 gm. in a cubic centimeter; that of the sodium iodide from 0.20 to 0.30 gm. and that of the sodium methylarsenate from 0.15 to 0.20 gm. The proportions of the other constituents of the composition do not vary.

The composition may be administered by mouth, the dose increased daily from three drops to thirty drops, increasing one drop a day; or by injections, the injections from 3/10 of 1 c. c. to ½ c. c. a day according to the condition of the patient.

The lymphatic substance increases the number and strength of the lymphocytes.

What I claim is:—

1. A composition for use in normalizing abnormal blood conditions consisting of a product derived by subjecting 15 grams of protein obtained from the lymphatic glands of an animal, diluted in 100 grams of distilled water, to exposure for five hours to the action of .50 gram of amylopsin, one gram of pepsin, and twenty-five drops of hydrochloric acid; exposing the mixture for five hours to the action of pancreatin; dializing the mixture for ten hours, filtering the mixture to obtain a filtrate, and drying the filtrate.

2. The method of preparing a composition for use in normalizing abnormal blood conditions, comprising the steps of subjecting 15 grams of protein obtained from the lymphatic glands of an animal, diluted in 100 grams of distilled water to exposure for five hours to the action of .50 gram of amylopsin, one gram of pepsin, and twenty-five drops of hydrochloric acid; exposing the mixture for five hours to the action of pancreatin; dializing the mixture for ten hours; filtering the mixture to obtain a filtrate; and drying the filtrate.

CARMELO BALDINI.